United States Patent
Najmabadi et al.

(10) Patent No.: US 11,239,785 B2
(45) Date of Patent: Feb. 1, 2022

(54) ELECTRIC MOTOR WITH INTEGRATED CHARGER

(71) Applicant: Ford Global Technologies, LLC, Dearborn, MI (US)

(72) Inventors: Ali Najmabadi, Ferndale, MI (US); Hadi Malek, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 499 days.

(21) Appl. No.: 15/801,919

(22) Filed: Nov. 2, 2017

(65) Prior Publication Data

US 2019/0126763 A1 May 2, 2019

(51) Int. Cl.
| | |
|---|---|
| H02P 23/00 | (2016.01) |
| H02J 7/02 | (2016.01) |
| H02P 25/22 | (2006.01) |
| B60L 53/24 | (2019.01) |
| B60L 53/14 | (2019.01) |
| H02P 25/18 | (2006.01) |

(52) U.S. Cl.
CPC ............ *H02P 25/22* (2013.01); *B60L 53/14* (2019.02); *B60L 53/24* (2019.02); *H02J 7/022* (2013.01); *H02P 25/18* (2013.01); *B60L 2220/56* (2013.01); *B60L 2220/58* (2013.01)

(58) Field of Classification Search
CPC .......... H02P 25/22; H02P 25/18; B60L 53/14; B60L 15/007; H02J 7/022; H02J 7/1415; B62D 5/0487
USPC .......................................... 318/496; 320/109
See application file for complete search history.

(56) References Cited

U.S. PATENT DOCUMENTS

| | | | |
|---|---|---|---|
| 4,920,475 A | 4/1990 | Rippel | |
| 5,099,186 A | 3/1992 | Rippel et al. | |
| 5,341,075 A | 8/1994 | Cocconi | |
| 8,299,732 B2 * | 10/2012 | Hoadley | H02M 5/14 318/105 |
| 8,432,126 B2 | 4/2013 | Hasan et al. | |
| 8,638,069 B2 | 1/2014 | Krauer | |
| 8,836,289 B2 * | 9/2014 | Flett | H02P 27/08 320/137 |
| 9,270,217 B2 | 2/2016 | Flett | |
| 10,071,763 B2 * | 9/2018 | Furukawa | B62D 5/0484 |
| 2015/0314694 A1 * | 11/2015 | Alakula | B60L 53/14 320/109 |
| 2016/0236580 A1 * | 8/2016 | Hou | B60L 11/1811 |
| 2018/0208236 A1 * | 7/2018 | Asao | B62D 6/08 |
| 2018/0226881 A1 * | 8/2018 | Chae | H02M 3/158 |
| 2018/0358875 A1 * | 12/2018 | Shin | H02K 16/025 |

* cited by examiner

*Primary Examiner* — Eduardo Colon Santana
*Assistant Examiner* — Zemenay T Truneh
(74) *Attorney, Agent, or Firm* — David B. Kelley; Brooks Kushman P.C.

(57) ABSTRACT

A vehicle includes an electric machine with two sets of galvanically isolated windings, first and second inverters, a switching arrangement, and a controller. During charge, the controller operates the switching arrangement to isolate the first inverter from the electric machine to permit charge current to flow through one of the sets and induce a voltage in the other of the sets. During propulsion, the controller operates the switching arrangement to couple the first inverter with the one of the sets such that the first and second inverters are configured to only power one of the sets.

15 Claims, 4 Drawing Sheets

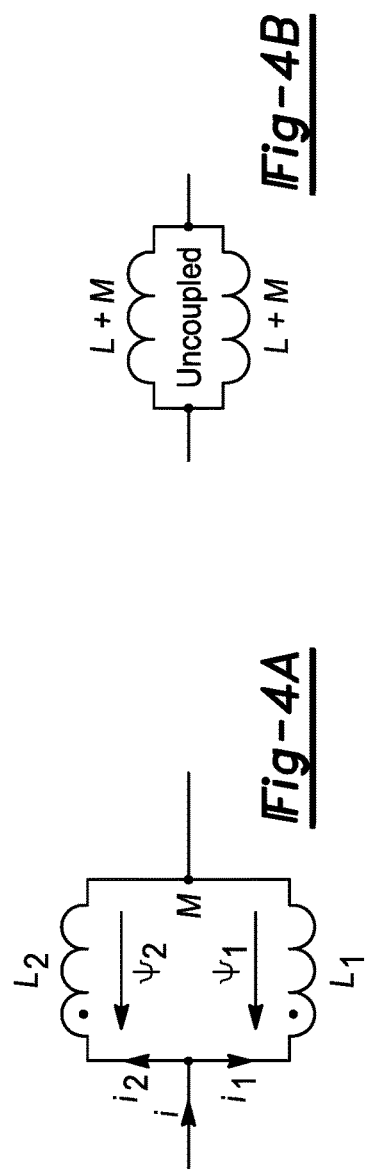
Fig-4A
Fig-4B
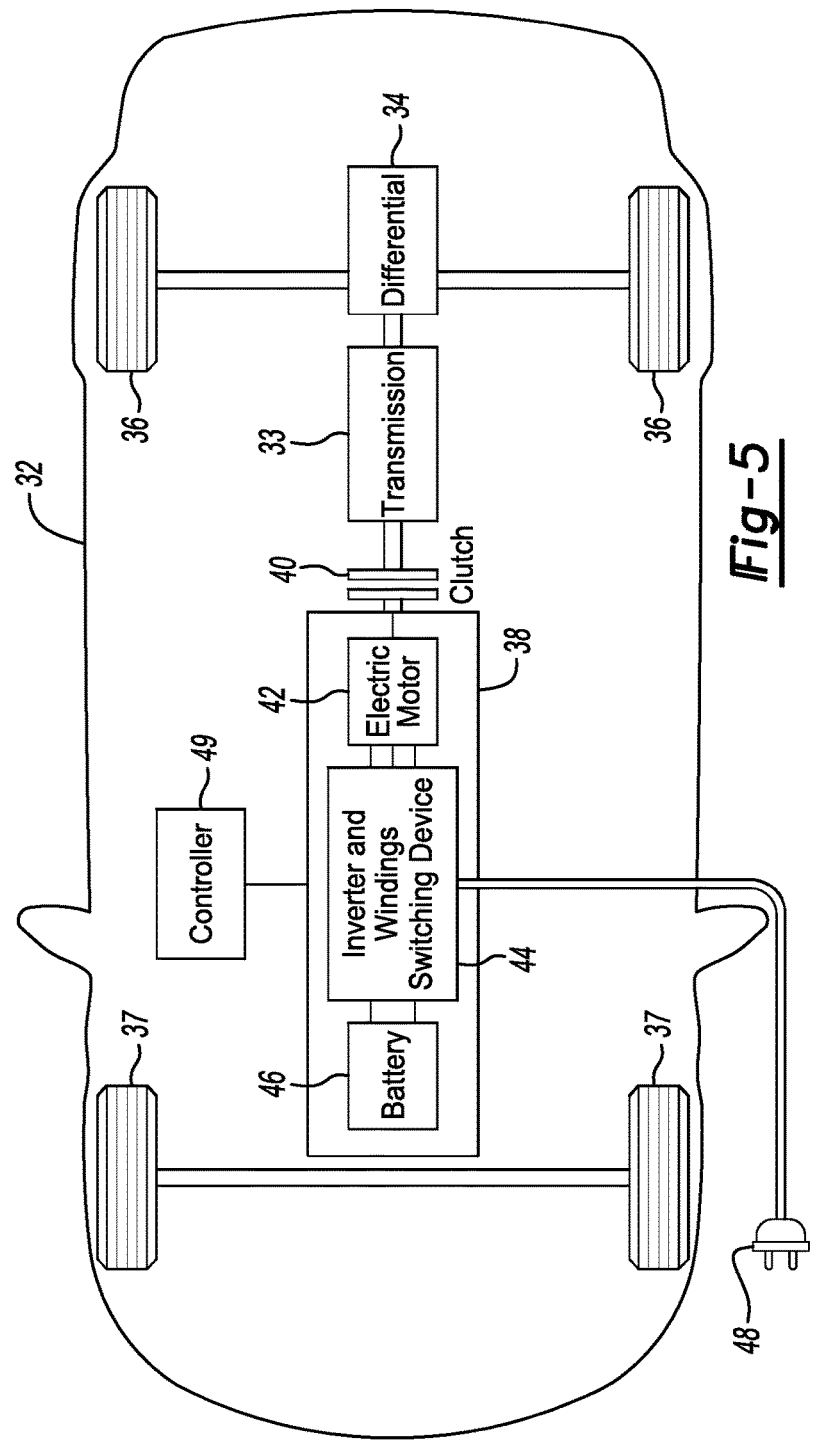
Fig-5

ELECTRIC MOTOR WITH INTEGRATED CHARGER

TECHNICAL FIELD

This disclosure relates to electric drive systems for automotive vehicles, and charging arrangements associated therewith.

BACKGROUND

Hybrid-electric vehicles (HEVs) and battery electric vehicles (BEVs) may rely on a traction battery to provide power to a traction motor for propulsion, and a power inverter therebetween to convert direct current (DC) power to alternating current (AC) power. The typical AC traction motor is a three-phase motor that may be powered by three sinusoidal signals each driven with 120 degrees phase separation. Also, many electrified vehicles may include a DC-DC converter to convert the voltage of the traction battery to an operational voltage level of the traction motor.

SUMMARY

A vehicle has an electric machine including two sets of galvanically isolated windings, first and second inverters, a traction battery, and a switching arrangement. The switching arrangement, during charge, isolates the first inverter from the electric machine such that current from a charge port coupled with a source flows through one of the sets and induces a voltage in the other of the sets to charge the battery while isolating the source from the battery.

A vehicle has an electric machine including two sets of galvanically isolated windings, first and second inverters each associated with only one of the sets, and a controller. The controller, during charge, isolates the first inverter from the electric machine to permit charge current to flow through one of the sets and induce a voltage in the other of the sets, and during propulsion, couples the first inverter with the one of the sets.

A method for operating a vehicle power system includes responsive to charge mode, isolating by a controller a first inverter from a first set of windings of an electric machine while a second inverter is coupled with a second set of windings of the electric machine that are galvanically isolated from the first set such that current from a charge port coupled with a source flows through the first set and induces a voltage in the second set to charge a traction battery while isolating the source from the traction battery.

BRIEF DESCRIPTION OF THE DRAWINGS

FIGS. 4a and 4b are schematic representations of effective inductance of electric machines.

FIG. 5 is a block diagram of a vehicle with an integrated charger.

DETAILED DESCRIPTION

Figure 1:
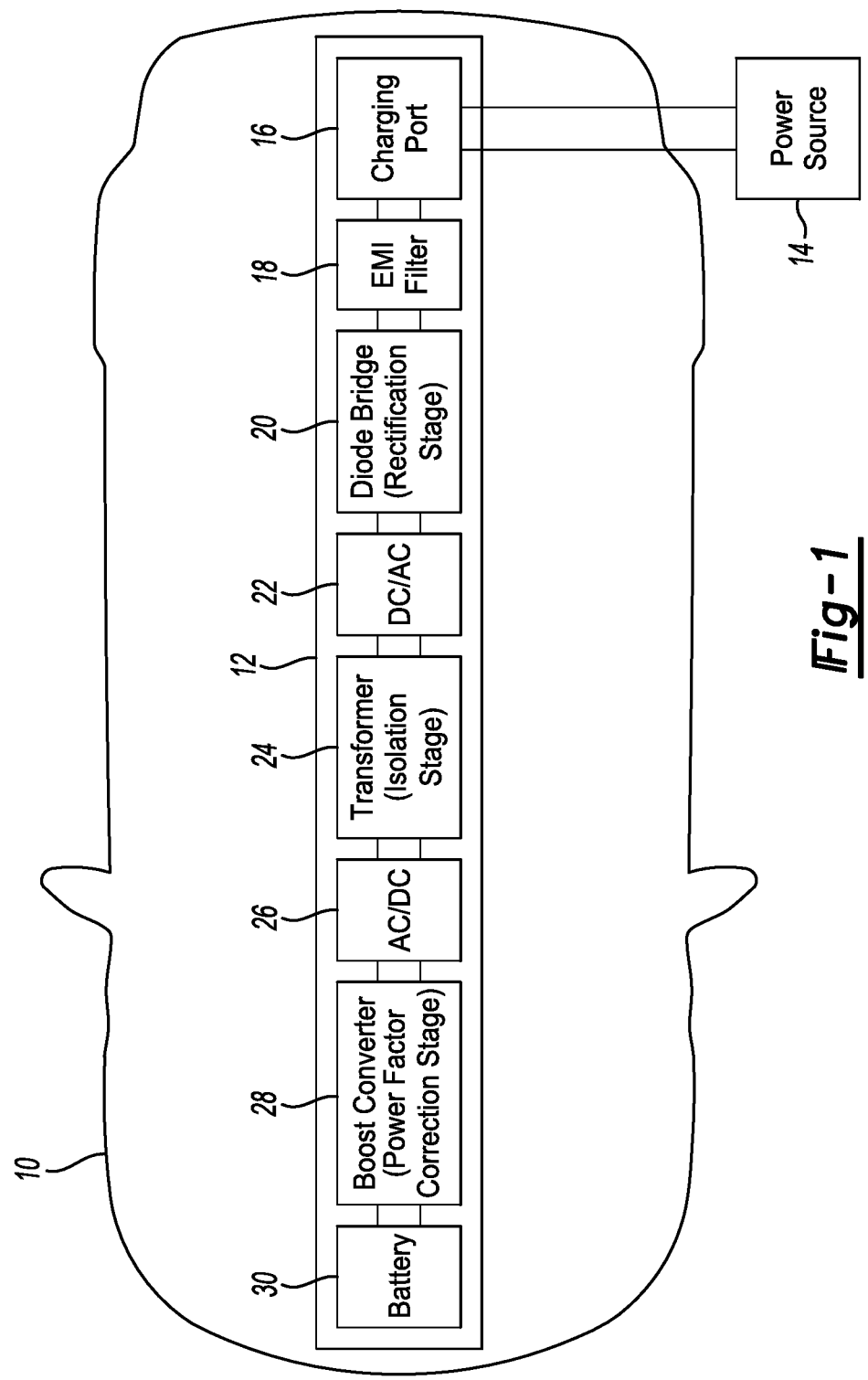
FIG. 1 is a block diagram of a typical on-board automotive vehicle charger.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Despite differences in their architectures, electric vehicles (EVs) have similarities in their structures. For instance, a battery, inverter, and electric motor are typically the main building blocks of any EV. To energize the battery and provide power for the motor, two types of chargers are employed: on-board chargers and off-board (stand-alone) chargers. On-board chargers give flexibility to charge anywhere there is an electric power outlet available. The on-board type has the potential drawback of adding weight, volume, and cost to the vehicles. Thus, any possibility of avoiding the issues of additional charger weight, space, and cost by using available hardware, mainly the electric motor and the inverter, to charger the battery is desirable. Considering the case in EVs, which during charging time the vehicle is not driven and during driving time it is not intended to charge the battery pack except for regeneration at braking, the integration of an on-board charger and traction system seems to be a feasible option.

There are specific requirements for on-board chargers (including galvanic isolation) which need to be fulfilled for any integrated system. Other aspects to consider regarding integrated chargers are voltage level adaption, unwanted developed torque in the motor during charging, efficiency, low harmonic contents in the current from the grid, and possible mandatory unity power factor operation.

Due to many advantages that integrated chargers can introduce to the system, different types of integrated chargers have been previously reported. Most of these integrated chargers however suffered from the lack of galvanic isolation in their structure. Here, certain proposed integrated charges provide galvanic isolation for the charging process.

Currently, some manufactures do not use integrated chargers and instead focus on on-board chargers which do not utilize the electric drive components. FIG. 1 illustrates a vehicle 10 with an on-board charger arrangement 12 operatively arranged with a power source 14. The on-board charger arrangement 12 includes a charging port 16, an electro-magnetic interference (EMI) filter 18, a diode bridge 20, a DC/AC converter 22, a transformer 24, an AC/DC filter 26, a boost converter 28, and a traction battery 30. The EMI filter 18 reduces high frequency electronic noise before providing input to the diode bridge 20. The transformer 24 provides isolation between the DC/AC converter 22 and the AC/DC converter 26. The boost converter 28 performs power factor correction (and possibly voltage adjustment) to output from the AC/DC converter 26 before providing input to traction battery 30.

Figure 2:
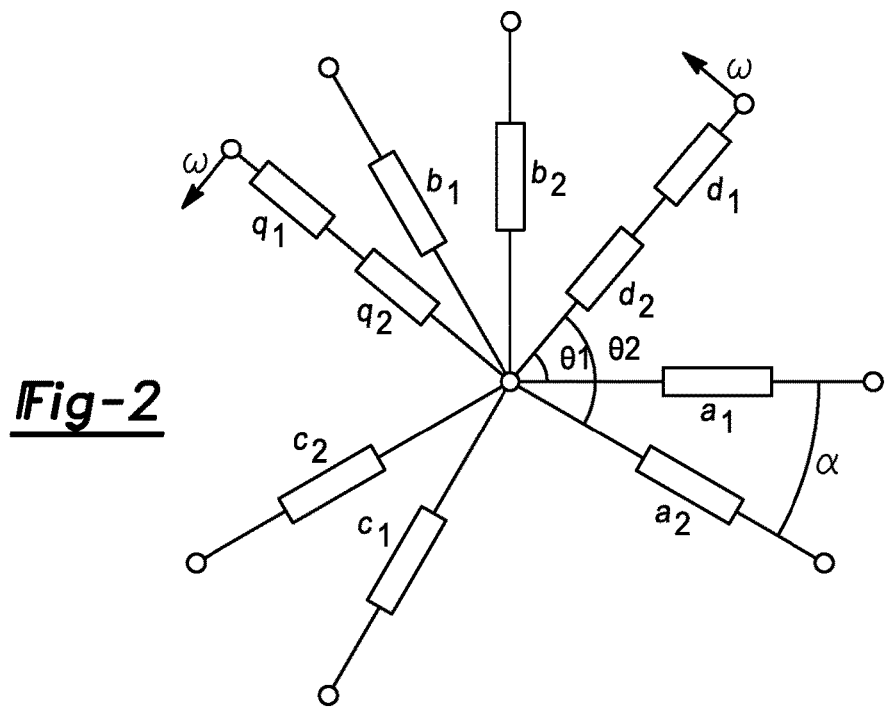
FIG. 2 is a schematic representation of a multi-phase electric machine.

For high power applications (e.g., electric vehicles), large AC machines sometimes include multiple windings (FIG. 2) fed by multiple inverters. Here, a1 is the inductance of phase a of winding set 1, a2 is the inductance of phase a of winding set 2, b1 is the inductance of phase b of winding set 1, b2 is the inductance of phase b of winding set 2, c1 is the inductance of phase c of winding set 1, c2 is the inductance of phase c of winding set 2, d1 is the inductance of winding set 1 along the d-axis, d2 is the inductance of winding set 2 along the d-axis, q1 is the inductance of winding set 1 along the q-axis, q2 is the inductance of winding set 2 along the q-axis, and ω is the electrical speed. The rotor d-axis is at the angle $\theta_1$ relative to the axis of phase a1, and at $\theta_2$ relative to the axis of phase $a_2$, and $\alpha = \theta_2 - \theta_1$.

Due to the structure of these multiphase machines, the mutual inductance (magnetic coupling) among groups of phases, in addition to individual phases, is inevitable. This is of interest not only for determining performance and designing control systems, but also for analyzing fault tolerance. This cross coupling among the windings (phases) can form a transformer when the energy is injected to only one group of windings.

Figure 3:
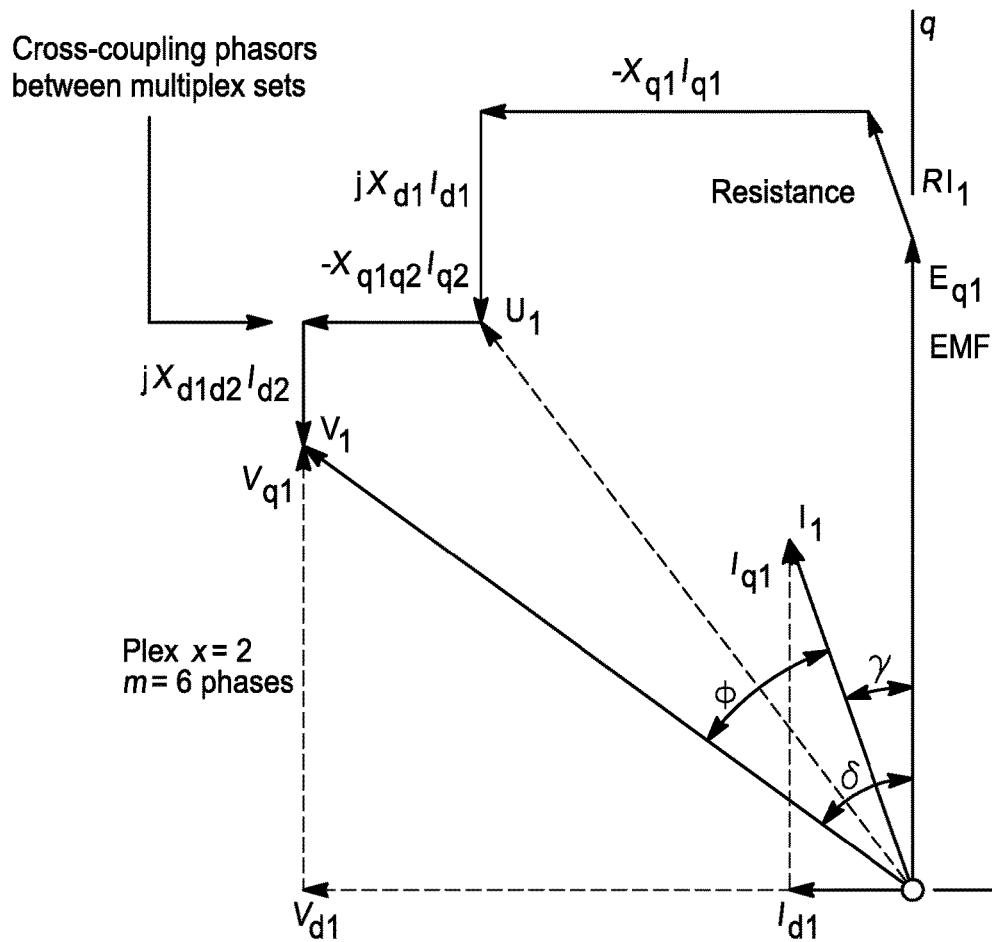
FIG. 3 is a phasor diagram of a multi-phase electric machine.

Under AC steady-state conditions, the RMS values of the d- and q-axis flux-linkages $\Psi_d$ and $\Psi_q$ can be combined into a phasor:

$$\Psi_i = \Psi_{di} + \Psi_{qi} \quad (1)$$

$$I_i = I_{di} + jI_{qi} \quad (2)$$

$$V_i = V_{di} + jV_{qi} = R_i I_i + j\omega \Psi_i \quad (3)$$

where, i=1, 2 and $V_{di} = R_i I_{di} - X_{qi} I_{qi} - X_{q1q2} I_{q2}$ and $V_{qi} = E_{qi} + R_i I_{qi} + X_{di} I_{di} + X_{d1d2} I_{d2}$. These equations have been described graphically in FIG. 3, where $\Psi_{di}$ is the flux linkage of winding set i along the d-axis, $\Psi_{qi}$ is the flux linkage of winding set i along the q-axis, $\Psi_i$ is the total flux linkage of winding set i, $I_{di}$ is the current of winding set i along the d-axis, $I_{qi}$ is the current of winding set i along the q-axis, $I_i$ is the total current of winding set i, $V_{di}$ is the voltage applied to winding set i along the d-axis, $V_{qi}$ is the voltage applied to winding set i along the q-axis, $V_i$ is the total voltage applied to winding set i, Ri is the resistance of winding set i, ω is the electrical speed, $E_{q1}$ is the back electromotive force (EMF) along the q-axis seen by winding set 1, $X_{d1}$ is the reactance of winding set 1 along the d-axis, $X_{q1}$ is the reactance of winding set 1 along the q-axis, $X_{d1d2}$ is the mutual reactance of winding sets 1 and 2 along the d-axis, $X_{q1q2}$ is the mutual reactance of winding sets 1 and 2 along the q-axis, ϕ is the angle between $I_1$ and $V_1$, γ is the angle between $I_1$ and $E_{q1}$, and δ is the angle between $V_{q1}$ and $E_{q1}$.

The cross-coupling terms appear in the phasor diagram as additional voltage-drops, which tend to limit the current. If α=0 (angle between group of phases), there is tightly coupled inductances between the two sets, as already observed; and if these sets are fed from a common voltage source, the current in each set will be approximately half the current that would flow in one set if the other were open-circuited. This is a practical point because it implies that in a duplex winding, if one set is open-circuited the current in the other set could increase by a factor approaching 200%, if it were not regulated. Likewise if one set is short-circuited, the impedance of the second set will be reduced and its current could also increase to a high value if it is not regulated.

The behavior of the duplex sets is analogous to that of parallel inductances, see FIGS. 4a and 4b, with an equivalent inductance of $$\frac{L_1 L_2 - M^2}{L_1 + L_2 - 2M} \quad (4)$$

In this case if L1=L2=L, then the effective inductance becomes $$\frac{L + M}{2} \quad (5)$$

where $\Psi_1$ is the flux of coil 1, $\Psi_2$ is the flux of coil 2, M is the mutual inductance of the coils, $L_1$ is the inductance of coil 1, $L_2$ is the inductance of coil 2, and i is the total current. Furthermore, when α=0, M becomes close to L and the effective equivalent inductance becomes L. At the same time, the coupling coefficient between the phases will be k=1 (theoretically). The total current is that which is limited by L, and half the current flows in each set. But if one set is open-circuited, the same total current will tend to flow in one set. The implication is that regulation of the current may be helpful.

Since the traction system and on-board charger are not functional simultaneously, and considering the acceptable amount of coupling between the phases, as discussed above, employing a multiphase electric machine as a transformer to create isolation for an on-board charger seems to be a logical approach. FIG. 5 illustrates a high-level proposed architecture for an integrated onboard charger and traction system. In this example, vehicle 32 includes a transmission 33 and differential 34 arranged to directly drive wheel/tire assemblies 36. (Wheel/tire assemblies 37 follow the driven wheel/tire assemblies 36.) The vehicle 32 also includes an electric drive system 38 configured to be selectively coupled with the transmission 33 via a clutch 40. The electric drive system 38 includes an electric motor 42, an inverter and windings switching device 44, and a traction battery 46. The inverter and windings switching device 44 is arranged to receive power from an external charge cord 48. Power received from the external charge cord 48 can be provided to the traction battery 46 via the inverter and windings switching device 44 for charging purposes. Similarly, power received from the traction battery 46 can be provided to the electric motor 42 via the inverter and windings switching device 44 to operate the electric motor 42. A controller 49 (or controllers, used interchangeably herein) is in communication with and controls the electric drive system 38. Of course, other and/or different vehicle configurations are also contemplated. Such configurations, for example, need not include the transmission 33, or clutch 40, etc.

As explained in further detail below, the inverter and windings switching device 44 and electric motor 42 perform as the traction system during vehicle propulsion, and participate in the charging process during charging of the traction battery 46.

Figure 6:
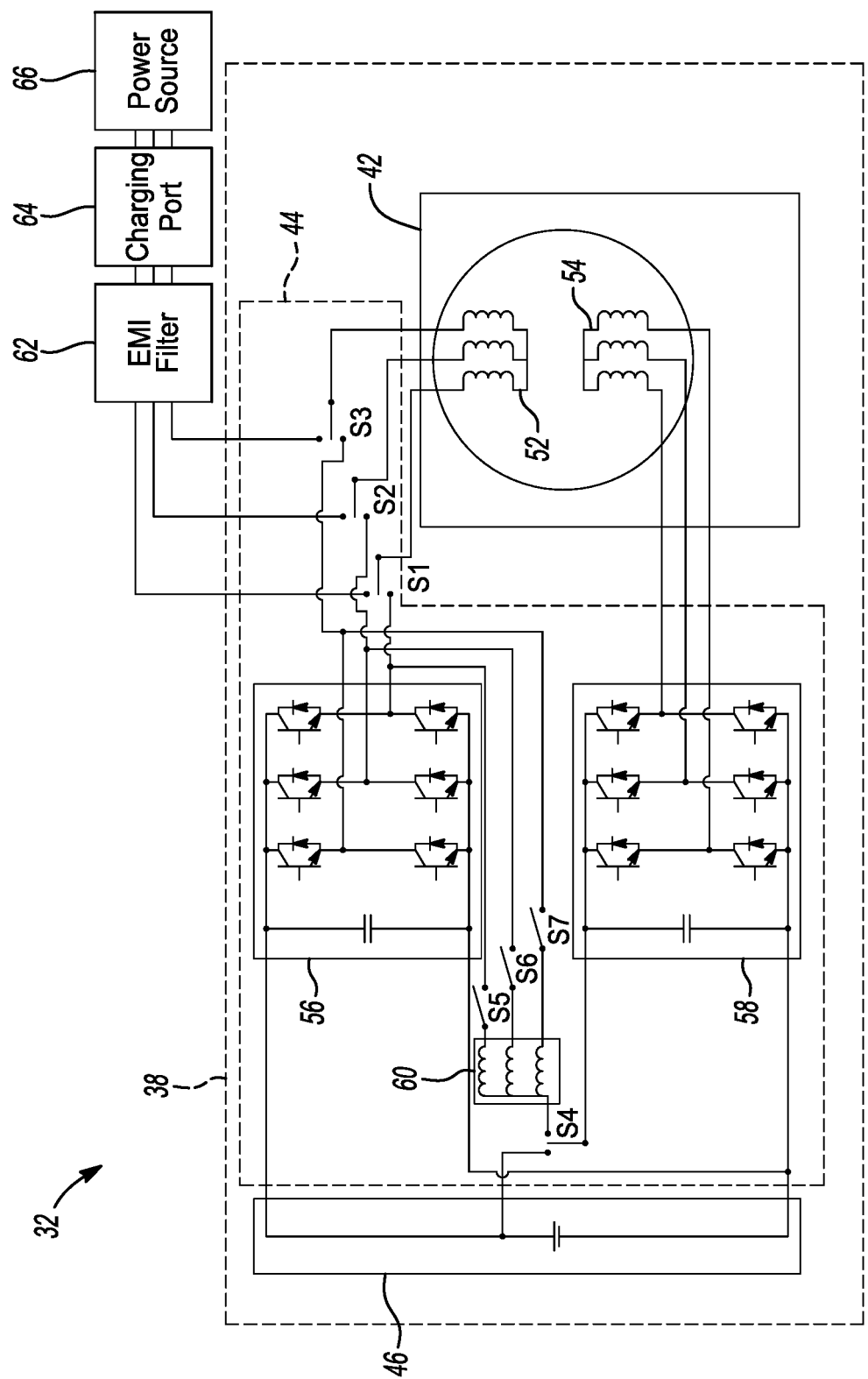
FIG. 6 is a schematic representation of an electric drive for a six-phase electric motor.

FIG. 6 shows one proposed topology for the electric drive system 38 of FIG. 5. In this example, the electric motor 42 includes two sets of windings 52, 54, and the inverter and windings switching device 44 includes a pair of inverters 56, 58, an inductor bank 60, and switches S1 through S7. The vehicle 32 also includes an EMI filter 62 and charge port 64. The charge port 64 is shown coupled with a remote power source 66. In traction mode, the controller 49 (FIG. 5) connects the switches S1, S2, and S3 between the windings 52 and the inverter 56, opens the switches S5, S6, and S7 to disconnect the inverter 56 from the inductor bank 60, and connects the switch S4 between the traction battery 46 and the inverter 58 thereby disconnecting the inverter 58 from the inductor bank 60. (In traction mode, the charge port 64 would, of course, not be coupled with the remote power source 66.) In charging mode, the controller 49 connects the switches S1, S2, and S3 between the windings 52 and the EMI filter 62, closes the switches S5, S6, and S7, and connects the switch S4 between the inverter 58 and the inductor bank 60 to couple the traction battery 46 with the remote power source 66. Thus, in both traction mode and charging mode, the charge port 64 is completely isolated from the traction battery 46.

The electric motor 42 is used as a transformer that is connected to the power source 66 via the EMI filter 62. These components provide the isolation stage. The inverter 58 acts as a rectifier that feeds the DC-DC boost converter, which is formed by the inverter 56 and the inductor bank 60. The DC-DC boost converter provides voltage regulation for charging and also acts as a power factor correction stage.

Some embodiments may offer certain advantages. The power source can be a single phase, two phase, or three phase. The primary rectification phase of the onboard charger can be removed. The DC/AC converter is removed. The electric motor can be used as a transformer. The AC/DC stage is achieved by using an existing inverter. The DC-DC converter is realized via an inverter and an inductor bank. The presence of three inductors and a three-phase inverter can permit an interleaved control strategy, which can further reduce the size and cost of the inductor bank. The interleaved control strategy can reduce the stress on the DC-link capacitor of the inverter 56. The elimination of the rectification stage and the DC/AC converter can increase the efficiency of the system.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
an electric motor including first and second sets of galvanically isolated windings;
first and second inverters, the second set of galvanically isolated windings being connected with the second inverter;
a traction battery; and
switches between the first inverter and first set of galvanically isolated windings configured to, during charge, disconnect the first inverter from the first set of galvanically isolated windings such that current from a charge port coupled with a source flows through the first set of galvanically isolated windings and induces a voltage in the second set of galvanically isolated windings to charge the traction battery while galvanically isolating the source from the traction battery.

2. The vehicle of claim 1, wherein the switches are further configured to, during propulsion, connect the first inverter with the first set of galvanically isolated windings while decoupling the charge port from the traction battery.

3. The vehicle of claim 1, wherein the second inverter is configured to rectify the voltage.

4. The vehicle of claim 3 further comprising an inductor bank and additional switches configured to connect the inductor bank with the first inverter to boost the voltage rectified by the second inverter.

5. The vehicle of claim 1, wherein the electric motor is a six-phase electric motor.

6. A vehicle comprising:
an electric motor including first and second sets of galvanically isolated windings;
a first inverter associated with the first set of galvanically isolated windings;
a second inverter connected with the second set of galvanically isolated windings; and
a controller configured to,
during charge, disconnect the first inverter from the first set of galvanically isolated windings to permit charge current to flow through the first set of galvanically isolated windings and induce a voltage in the second set of galvanically isolated windings, and
during propulsion, to connect the first inverter with the first set of galvanically isolated windings.

7. The vehicle of claim 6, wherein the second inverter is configured to rectify the voltage.

8. The vehicle of claim 7 further comprising an inductor bank, wherein the controller is further configured to connect the inductor bank with the first inverter to boost the voltage rectified by the second inverter.

9. The vehicle of claim 6, wherein disconnecting the first inverter from the first set of galvanically isolated windings galvanically isolates a traction battery from a charge port coupled with a source of the charge current.

10. The vehicle of claim 6, wherein connecting the first inverter with the first set of galvanically isolated windings decouples a traction battery from a charge port.

11. The vehicle of claim 6, wherein the electric motor is a six-phase electric machine.

12. A method for operating a vehicle power system comprising:
  responsive to charge mode, disconnecting by a controller a first inverter from a first set of windings of an electric motor while a second inverter is connected with a second set of windings of the electric motor that are galvanically isolated from the first set of windings such that current from a charge port coupled with a source flows through the first set of windings and induces a voltage in the second set of windings to charge a traction battery while galvanically isolating the charge port from the traction battery.

13. The method of claim 12, further comprising rectifying by the second inverter the voltage.

14. The method of claim 13, further comprising boosting by an inductor bank and the first inverter the voltage rectified by the second inverter.

15. The method of claim 12 further comprising, responsive to propulsion mode, connecting by the controller the first inverter with the first set of windings.

\* \* \* \* \*